United States Patent
Fetouhi et al.

(10) Patent No.: US 8,006,256 B2
(45) Date of Patent: Aug. 23, 2011

(54) OPTICAL DISC MEDIUM HAVING CLAMPING REGION WITH PROTRUDING STRUCTURES

(75) Inventors: Al Fetouhi, Nanteuil-les-Meaux (FR);
Roger Nute, Chigne (FR)

(73) Assignee: Ecodisc Technology AG, Hergiswil (CH)

( * ) Notice: Subject to any disclaimer, the term of this patent is extended or adjusted under 35 U.S.C. 154(b) by 1038 days.

(21) Appl. No.: 11/780,883

(22) Filed: Jul. 20, 2007

(65) Prior Publication Data

US 2009/0040916 A1 Feb. 12, 2009

(30) Foreign Application Priority Data

| Nov. 15, 2006 | (EP) | 06023768 |
| Nov. 15, 2006 | (EP) | 06023769 |
| Jan. 29, 2007 | (EP) | 07001865 |
| Apr. 5, 2007 | (EP) | 07007180 |

(51) Int. Cl.
*G11B 7/24* (2006.01)
*G11B 3/70* (2006.01)

(52) U.S. Cl. ........................................ 720/718

(58) Field of Classification Search ................... 369/283, 369/282; 720/718, 721
See application file for complete search history.

(56) References Cited

U.S. PATENT DOCUMENTS

| 4,785,444 A * | 11/1988 | Nakane et al. ............... 369/282 |
| 5,326,240 A * | 7/1994 | Kudo et al. ..................... 425/3 |
| 5,476,700 A * | 12/1995 | Asai et al. ................... 428/66.6 |
| 5,541,910 A | 7/1996 | Tanaka et al. ................. 369/290 |
| 5,864,534 A | 1/1999 | Fairchild et al. ............... 369/290 |
| 5,987,003 A * | 11/1999 | Yokota ........................... 369/280 |
| 5,999,513 A | 12/1999 | Arakawa et al. ............... 369/282 |
| 6,002,663 A * | 12/1999 | Sandstrom ..................... 369/282 |
| 6,022,663 A | 2/2000 | Chen et al. ..................... 430/124 |
| 6,154,441 A * | 11/2000 | Sandstrom et al. ........... 369/282 |
| 6,252,842 B1 | 6/2001 | Mukawa ......................... 369/270 |
| 6,495,235 B2 * | 12/2002 | Uchida et al. ................. 428/64.1 |
| 6,865,745 B2 * | 3/2005 | Myrtle ........................... 720/724 |
| 7,012,880 B2 * | 3/2006 | Kim et al. ...................... 369/280 |
| 7,409,699 B2 * | 8/2008 | Hayashi et al. ................ 720/719 |
| 7,831,986 B2 * | 11/2010 | Kim et al. ...................... 720/719 |
| 2002/0034154 A1 | 3/2002 | Iwata et al. .................... 369/282 |
| 2002/0075794 A1 | 6/2002 | Park ............................... 369/282 |
| 2003/0076769 A1 | 4/2003 | Kim et al. ................... 369/112.26 |
| 2004/0228263 A1 | 11/2004 | Netsu et al. ................. 369/275.3 |

FOREIGN PATENT DOCUMENTS

| DE | 20 2005 017 196 U1 | 3/2006 |
| EP | 1 258 872 | 11/2002 |
| EP | 1 291 874 | 3/2003 |
| EP | 1 396 855 | 3/2004 |
| FR | 2 887 678 | 12/2006 |
| JP | 01-064163 | 10/1989 |
| JP | 08-167272 | 6/1996 |
| JP | 09-017079 | 1/1997 |
| WO | 2006/096367 | 9/2006 |

* cited by examiner

*Primary Examiner* — Angel A. Castro
(74) *Attorney, Agent, or Firm* — John D. Titus

(57) ABSTRACT

A recording layer is described that is at least partially or entirely positioned at a distance $T_7$ of less than 0.4 mm with respect to the second surface. When the optical recording medium is clamped in a drive, the recording layer has a "higher" position than a recording layer of a known DVD. The layer structure of the described optical recording medium reduces the thickness of the disc in an area of the recording layer. In particular, a thickness $T_1$ of only 0.4 to 0.7 mm is possible while maintaining the reliability of the optical recording medium (i.e. without reading problems in most or all drives). Further, the optical recording medium may have only one substrate, i.e. only one disc of polycarbonate, whereas the other side of the recording layer is only covered by a protective lacquer.

22 Claims, 16 Drawing Sheets

OPTICAL DISC MEDIUM HAVING CLAMPING REGION WITH PROTRUDING STRUCTURES

RELATED APPLICATIONS

This application claims priority to European Patent Convention application having the patent application number 06023768.2, filed Nov. 15, 2006; European Patent Convention application having the patent application number 06023769.0, filed Nov. 15, 2006; European Patent Convention application having the patent application number 07001865.0, filed Jan. 29, 2007; and European Patent Convention application having the patent application number 07007180.8, filed Apr. 5, 2007, the entirety of each is incorporated herewithin.

TECHNICAL FIELD

The present invention relates to a recording medium, in particular to an optical recording medium including a substrate and a signal recording layer provided on the substrate.

BACKGROUND

As one of the conventional recording media for audio, video and/or other information, optical discs such as CDs and DVDs, from which recorded information is read using a light beam or to which information is written using a light beam, are widely used. Since such an optical disc is formed from a single plate-like substrate, it can easily be handled and has a larger storage capacity than other recording media such as magnetic tapes, etc. Therefore, the optical discs are widely used as media for recording audio and video information, computer-processed data, etc. Recording media for audio, video and/or other information, such as CDs and DVDs are e.g. known from U.S. Pat. No. 5,541,910, U.S. Pat. No. 5,864,534, U.S. Pat. No. 6,002,663, U.S. Pat. No. 6,252,842 and US 2002/0034154 A1.

Information processing units, such as computers, CD/DVD players, digital cameras and video cameras, have been designed more and more compact with an increasingly smaller internal space of installation for a recording and/or reproducing apparatus using an optical recording medium such as an optical disc or the like. Accordingly, optical discs are also known in the prior art, e.g. from US 2004/0228263 A1, which only have a diameter of 65 mm or less.

US 2004/0228263 A1 discloses an optical disc having a thickness of only 0.4 mm to 0.7 mm, i.e. significantly thinner than conventional optical discs which have a thickness of about 1.2 mm. Such optical discs are also called light weight optical discs (LODs) or thin video discs (TVDs). With this measure it is achieved to reduce the amount of material which is necessary for manufacturing an optical disc and thus to significantly reduce the manufacturing costs. However, in the area around the axis of the optical disc described in US 2004/0228263 A1—the so called clamping are—, the substrate has a thickness of 1.2 mm, because this distance is prescribed for conventional recording and/or reproducing devices (e.g. drives for computers or CD/DVD players). However, the optical disc disclosed in US 2004/0228263 A1 has the drawback that the physical and optical properties are not satisfying. As a result, this optical disc is not a reliable recording medium.

SUMMARY

It is an object of the present invention to provide a novel light weight optical recording medium which has an increased reliability. In particular, the novel optical recording medium should meet the prescribed tolerances of various types of recording and/or reproducing devices so that problems concerning playability are reduced or avoided.

This object is achieved by an optical recording medium as defined in claims 1, 2, 8, 9, 13, 14 and 18. The dependent claims depict advantageous embodiments of the invention.

The present invention refers to an optical recording medium comprising a substrate (e.g. made of polycarbonate) and at least one recording layer for storing data, wherein the structure of the recording layer is formed such that the data can be read using a light having a wavelength of in particular 650 nm±50 nm, or less, e.g. 405 nm±30 nm. A wavelength of 650 nm is used for reading DVDs, whereas CDs can only be read with a wavelength of 780 nm. From a structural point of view, the structure of the recording layer has pits and lands with a height difference of 650 nm/4±10%. Due to the reflection at the pits and lands, there is a phase difference of $\lambda/2$ which results in interference effects so that the photo detectors of the reading device can read the optical recording medium.

A storage medium according to the present invention should preferably be readable by a vast majority of DVD players of the consumer market. This includes actual models (by beginning of the year 2007) as well as types being several years old and in a used condition, including typical DVD players which are integrated into computers and the like. There is no specified standard for DVD players. The DVD players are designed according to the very detailed specification of the DVD, in particular the different types like DVD-5, DVD-9, 80 mm disc, 120 mm disc and the like. As far as the term "DVD" is used in the present document, it is to be understood as a DVD according to the mentioned standard specification. Such specification is contained e.g. in the document "DVD Specifications for Read-Only Disc, Part 1, Physical Specifications"; Version 1.04, June 2002; publisher: DVD Format/Logo Licensing Corporation, Daimon Urbanist Bldg. 6F, 2-3-6 Shibadaimon, Minatoku Tokyo, 105-0012 Japan; homepage: www.dvdfllc.co.jp. This document is herewith incorporated by reference.

According to one aspect of the present invention, the recording layer is at least partially or entirely positioned at a distance $T_7$ of less than 0.4 mm with respect to the second surface. In particular, the recording layer may be positioned at a distance $T_7$ of less than 0.3 mm with respect to the second surface. The (upper) second surface is usually covered by a printing layer so that the optical recording medium is designed to be read with a laser which is positioned on the side of the (lower) first surface of the optical recording medium. With that, the optical recording medium of the present invention has a recording layer of a DVD, whereas the recording layer is positioned at a height as the recording layer of a known CD as will be explained in more detail in context with FIGS. 1 to 7. The inventive recording medium thus has a recording layer which is very closely positioned to the (upper) second surface, whereas the recording layer of known DVDs is in the middle of the recording medium (sandwiched between to discs of polycarbonate). Therefore, when the optical recording medium of the present invention is clamped in a drive, the recording layer has a "higher" position than a recording layer of a known DVD.

Many DVD drives are only designed to read DVDs having a recording layer in the middle of the disc. However, the inventive optical recording medium can be read with a drive which is suitable for reading DVDs and CDs, because such drives have a height adjustable reading means. As a result, the layer structure of the inventive optical recording medium is an important feature for reducing the thickness of the disc in an area of the recording layer. In particular, a thickness $T_1$ of only 0.4 to 0.7 mm is possible (see FIG. 7) while remaining the reliability of the optical recording medium (i.e. without reading problems in most or all drives). Further, it is achieved that the optical recording medium may have only one substrate, i.e. only one disc of polycarbonate, whereas the other side of the recording layer may only be covered by a protective lacquer. With that, manufacturing of the inventive optical recording medium is facilitated and more cost-efficient. In particular, only 7.7 to 8.0 grams polycarbonate are needed for manufacturing an optical recording medium according to the present invention compared to about 13-20 grams polycarbonate for a DVD-5.

According to a second aspect of the present invention, the recording layer is at least partially positioned at a distance $T_5$ of more than 0.9 mm from a plane defined by a surface of a clamping area of the optical recording medium. The clamping area preferably defines the maximum thickness $T_2$ of the optical recording medium, wherein there is a height difference between lowest surface of the clamping area and the (lower) first surface of the optical recording medium. Therefore, the mentioned plane is a virtual plane below the first surface which is perpendicular to the axis A of the optical recording medium, and which is further defined by the lowest point(s) or lowest surface of the clamping area of the optical recording medium. As a result, the recording layer is arranged at a higher position (namely more than 0.9 mm with respect to the lowest surface of the clamping area) when the optical recording medium is clamped in a drive, whereas the recording layer of a known DVD is arranged at a position of about 0.6 mm with respect to the lowest surface of the clamping area.

According to a third aspect of the present invention, the optical recording medium has a clamping area with a thickness $T_2$ which is greater than the distance $T_1$ between the first surface and the second surface, wherein the recording layer is at least partially or entirely positioned at a distance $T_8$ of more than 0.4 mm from the first surface. Preferably, the increased thickness of the clamping area results in that the position of the recording layer is at a height of more than 0.9 mm with respect to the lowest surface of the clamping area.

According to a fourth aspect of the present invention, the optical recording medium has a first ring on the (lower) first side of the optical recording medium which extends at least in the outer section of the clamping area of the optical recording medium. According to the present DVD/CD standard, the clamping area is defined by an area located within a radius of about 16 or 17 mm with respect to the axis of the optical recording medium (the diameter of the clamping area is about 33 mm). Further, it is preferred to provide a second ring on the first side of the optical recording medium which extends at least in the inner section of the clamping area of the optical recording medium.

In a preferred embodiment of the invention, the first ring may have a thickness which is equal or slightly smaller than the thickness of the second ring (see FIG. 7). Further, the first ring may have an outer diameter in the range between about 26 and 35 mm and an inner diameter in the range between about 22 and 26 mm, while the second ring may have an outer diameter in the range between about 16 and 22 mm. The inner radius of the second ring may be aligned with the inner sidewall of the center hole having a diameter of about 15 mm. The inner and/or an outer edge of the first and/or the second ring may be sharp, meaning substantially parallel to the axis A of the optical recording medium. The inner and/or outer edge of the first and/or the second ring may also be sloped, meaning inclined with respect to the axis A of the optical recording medium. When being sloped, the edge preferably forms an angle in the range between about 10° and 60°, in particular about 30°, with respect to a plane perpendicular to the axis A of the optical recording medium.

One major issue when designing an optical recording medium are the optical properties of the optical recording medium. The throughput and hence cost effectiveness of production are enhanced the quicker a moulding process of the medium can be performed. On the other hand, a fast production step like a low duration of stay in a casting mould leads to high cooling rates or other effects causing a degraded optical performance of the substrate. In particular, the resulting optical property of birefringence is a crucial value. Due to their higher thickness, after a moulding process the rings on the first (lower) side of the optical recording medium tend to cool down with a lower cooling rate than the radially adjacent substrate, providing material stress in the cooled state. This might lead to an enhanced birefringence of the substrate material in the region adjacent to the rings. Especially this adjacent region is crucial concerning the optimization of a production throughput versus the size of the local birefringence. In this respect, it is useful if the region of enhanced birefringence is sited mainly in the clamping area of the optical recording medium and the first (outer) ring may be positioned at a sufficient distance from the beginning of the lead-in area of the optical recording medium, containing data and starting at a diameter of about 45 mm. The second (outer) ring may be arranged towards the middle of the clamping area which is at a diameter of about 24 mm. Due to the cooling process after moulding the optical recording medium as mentioned above, it is also preferable that the first (outer) ring has a smaller thickness than the second (inner) ring. Thus, the occurrence of material stresses as discussed above may be reduced.

Another major issue when designing an optical recording medium are the physical properties of the optical recording medium, in particular for clamping the optical recording medium in a drive of a player. The first and/or the second ring may be designed in such a way as to be suitable for clamping in all different kinds of players. According to the "DVD Specifications" mentioned above, there are three basic types of drives and clamping mechanisms which will be explained in more detail in context with FIGS. 14a to 14c.

It has in particular been a challenge to design an optical recording medium suitable for the so called "note book type drive" (refer to FIG. 14a). Therefore, in a preferred embodiment of the invention, the first and the second ring may especially be designed for clamping in a "note book type drive". In this case, the first ring may in particular have an outer diameter of about 28 mm and an inner diameter of about 23.5 mm, whereas the second ring may have an outer diameter of about 18.5 mm and an inner diameter of about 15 mm. The outer and inner edge of the first ring as well as the outer edge of the second ring are preferably sloped having an angle of about 30° or less. The inner edge of the second ring is preferably a sharp edge and is aligned with the inner sidewall of the center hole. Consequently, the first ring is basically at the same radial position as the tray of the clamping mechanism of the "note book type drive", while the second ring fits into the gap between the tray and the center hole part. Nevertheless, it has to be noted that the optical recording medium should also be suitable for other kinds of drives.

Additionally, for the so called "note book type drive", focusing of the light beam has been quite an issue. The focusing mechanism of the light beam is very simple for these drives, thus making it hard to focus the light beam on a recording layer which is not positioned at the same position like a recording layer of a conventional DVD. These drives are also known as "half height drives" since they take up only half the vertical space of a conventional "full height drive". Due to the space restrictions, the focusing mechanism of the light beam is not servo driven on springs for finding the focal point in a control loop, as it is the case in most conventional drives. In a "half height drive" the focusing mechanism comprises a very small electromagnetic coil which moves the lens up and down constrained by space. The speed of seeking the information layer is reliant on the kind of lens used. Therefore, for these drives the position of the recording layer of an optical recording medium is an essential issue, due to the restricted movement of the lens.

In a preferred embodiment of the invention, the first ring has a thickness which is between 0.2 and 0.5 mm, in particular about 0.3 mm. The second ring may have a thickness which is between 0.3 and 0.6 mm, in particular about 0.45 mm. In this case, when the substrate has a thickness of about 0.6 mm and the ring has a thickness of about 0.45 mm, the recording layer is placed at a position of about 1.05 mm from a plane defined by the surface of the clamping area. Such an optical recording medium is readable in the vast majority of players, even in a "note book type drive".

Though, when, due to the small thickness of the rings, the recording layer is placed at a position of about 1.05 mm from a plane defined by the surface of the clamping area, the problem arises that the finished optical recording medium does not have the conventional maximum total thickness of about 1.2 mm. This might be a problem for the readability and/or the clamping of the medium in some players.

According to a fifth aspect of the present invention, the optical recording medium therefore comprises at least one ring or one or more protrusions on the second (upper) side of the optical recording medium which extend at least in the clamping area of the optical recording medium, preferably in the inner section of the clamping area. The at least one ring or the one or more protrusions have a thickness which is between 0.1 and 0.3 mm, in particular about 0.15 mm. When the recording layer is positioned at about 1.05 mm from a plane defined by the surface of the clamping area, the maximum total thickness of the finished optical recording medium in the clamping area would consequently be about 1.2 mm, as it is the case for a conventional DVD. Nevertheless, the thickness of the optical recording medium in an area outside of the clamping area is in the range between about 0.4 to 0.7 mm, which results in a much lighter optical recording medium compared to a conventional DVD.

Conventionally, the recording layer of an optical recording medium is covered by a thin lacquer layer for protection and generally also at least one thin printing layer on the side of the second surface of the optical recording medium.

In a preferred embodiment of the invention, the at least one ring or the one or more protrusions are formed by least one printing layer on the side of the second surface of the optical recording medium. It has been found that the technique of affixing letters for blind people can also be applied to the printing on an optical recording medium. The Braille system is a method that widely used by blind people to read and write. It uses a dot pattern, which can be sensed with fingertips as raised portions. Therefore, the at least one ring or the one or more protrusions may have a thickness which is sensible by the human sense of touch, like in the case of the Braille system. By this printing technique, it is possible to produce protrusions of up to about 0.25 mm (opposed to a conventional printing layer thickness of about 0.02 mm). This process is cheap, easy and does not require the use of any additional material.

The protrusions may form a plurality of dot patterns. Preferably, the protrusions (or dot patterns) are arranged symmetrical about the center hole of the optical recording medium. In particular the protrusions/patterns may be arranged at angular positions of 120° degrees apart from each other, thereby forming three separate groups, or at angular positions of 60° degrees apart from each other, thereby forming six separate groups. The dot patterns may comprise straight lines of dots, circles of dots, rectangles or squares of dots or any other conventional geometry. In a preferred embodiment the dot pattern comprises rhombuses of dots, since this pattern is easy to produce.

Nevertheless, it has to be noted that the at least one ring or the one or more protrusions may be formed not only by printing, but in any other conventional way, e.g. by a second substrate or any other material (e.g. plastic) attached (e.g. bonded) to the second (upper) side of the optical recording medium.

According to a sixth aspect of the present invention, the inventive method of manufacturing an optical recording medium of the present invention comprises the step of providing at least one printing layer on the side of the second (upper) surface of the optical recording medium, thereby preferably forming the least one ring or the one or more protrusions. The printing layer may be provided by screen printing, though another printing technique, like offset printing for example, may be employed.

When screen printing is used by means of a printing device, the optical recording medium is placed into a cavity of the printing device adapted to retain it in position (e.g. by its circumferential form and/or by means of nest pads) and it is lifted to the correct height. Additionally, vacuum is applied to the first (lower) surface by means of a vacuum pump. Then, a predetermined quantity of ink of a specific colour is placed on top of a mesh screen which is located in a mesh frame above the cavity. A blade is then pressed down and moved forward and backward across the mesh screen, thereby applying the ink to the second (upper) surface of the optical recording medium through the mesh screen. This process described for applying the ink may be repeated for several different colours. Then, especially when UV activated ink is used, the optical recording medium may be placed under an UV lamp of the printing device for activating the UV activated ink.

As mentioned above a technique similar to the one used for the Braille system may be employed. The material used to form the protrusions can be an UV activated ink as described above. Though, any other conventional printing or protective material (e.g. polymer) can be used. When producing protrusions similar to the Braille system, a mesh with an increased size of the holes compared to a conventional CD or DVD printing technique may be used. Additionally, the process parameters of the printing process might have to be changed. Nevertheless, the conventional method of producing an optical recording medium does not have to be changed drastically.

According to a seventh aspect of the present invention, the data capacity of the optical recording medium can be increased by a second recording layer carried by a second substrate on the side of the second surface of the first substrate, and wherein the first recording layer is semi transparent so that a laser beam can pass through the first recording layer for reading the second recording layer. The second substrate may have a thickness of only about 0.1 mm or less, in particular 0.08 mm to 0.15 mm. With this measure, the data capacity is doubled wherein only a minimum additional amount of polycarbonate is needed for the second substrate. The (lower) first substrate and the (upper) second substrate are bonded together by a thin resin layer which has a thickness of about 0.02 to 0.08 mm, in particular about 0.05 mm. The (lower) first substrate has a thickness of about 0.4 to 0.6 mm, in particular about 0.50 to 0.56 mm, in particular about 0.525 mm.

For manufacturing the second substrate, it is possible to use an extruded sheet of polycarbonate which is for example 0.1 mm thick, and to create the data image on the surface by using a standard nickel stamper in a hot embossing press. The second substrate may then be coated with a fully reflective metal coating to create the recording layer and be bonded together with the first substrate by the thin resin layer, e.g. a bonder cured by UV light through the first substrate.

Another example of manufacturing the second substrate is to use a molded substrate of plastic, in particular PMMA, and to create the data image on the surface by using a standard nickel stamper (known as 2p process). The second substrate may then be coated with a fully reflective metal coating to create the recording layer and be bonded together with the first substrate by the thin resin layer, e.g. a bonder cured by UV light through the first substrate. Then, the substrate of plastic can be peeled off the metal coating and can be re-cycled. The metal coating can be protected using a conventional lacquer layer.

The invention further comprises the use of a CD or DVD manufacturing system for manufacturing an optical recording medium as described above. Preferably, the system basically comprises a standard production line for the production of CDs. In a particular embodiment, the system comprises a die for moulding a substrate of the medium has a modified shape at least in a clamping area of the medium. In a further embodiment, the system comprises at least one support structure of at least one holding device for holding the medium which has a modified shape at least in a clamping area of the medium. One particular aspect of the invention is that an inventive storage medium may be produced on standard production lines with only small changes being applied to the line, e.g. changing the die and/or changing holding and transfer devices according to the special shape of the recording medium. In this respect it is very cost effective to use existing CD-production lines for the production, particularly if the produced medium can be read with a DVD player and has the according data format and data density of a DVD. This adds to a major saving of investment costs for existing manufacturing plants as part of an increasing demand for DVDs is correlated with a decrease in demand of CDs. Even more, CD production lines are mostly cheaper to buy than DVD lines.

DESCRIPTION OF THE DRAWINGS

FIG. 15 shows a cross-sectional view of an optical recording medium according to the invention in its clamped state in a clamping mechanism of the first type shown in FIG. 14a;

DETAILED DESCRIPTION

Figure 1:
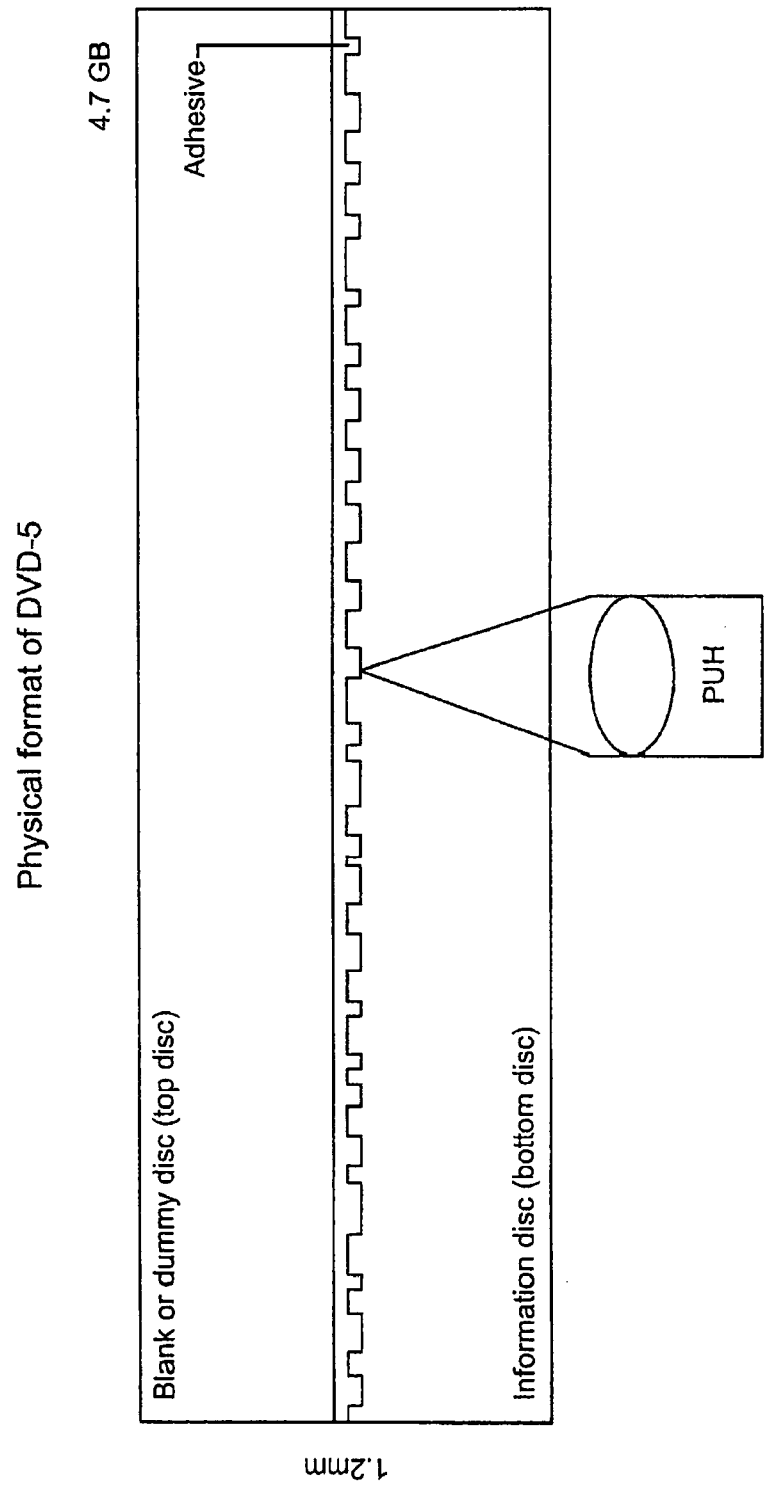
FIG. 1 shows a partial cross-sectional view of a known DVD-5.

For a full understanding of the invention, the physical formats of DVDs and CDs according to the state of the art are discussed in the following. FIG. 1 shows a partial cross-sectional view of a known DVD-5. A DVD-5 comprises an information disc (bottom disc) 1 and a blank or dummy disc (top disc) 2 both made of polycarbonate and bonded together by a resin layer 4. The upper surface of the information disc is structured and carries a recording layer 3 made of aluminum. The recording layer 3 forms so-called pits and lands which correspond to the data stream stored on the DVD-5 (the total storage capacity of a DVD-5 is 4.7 GB). The total thickness of a DVD-5 is about 1.2 mm, wherein the thickness of the information disc 1 has a thickness of about 0.6 mm so that the recording layer 3 is positioned with a distance of about 0.6 mm from the outer surface of the information disc 1. For reading the data stream stored on the DVD-5, a laser beam 5 is focused on the recording layer 3.

Figure 2:
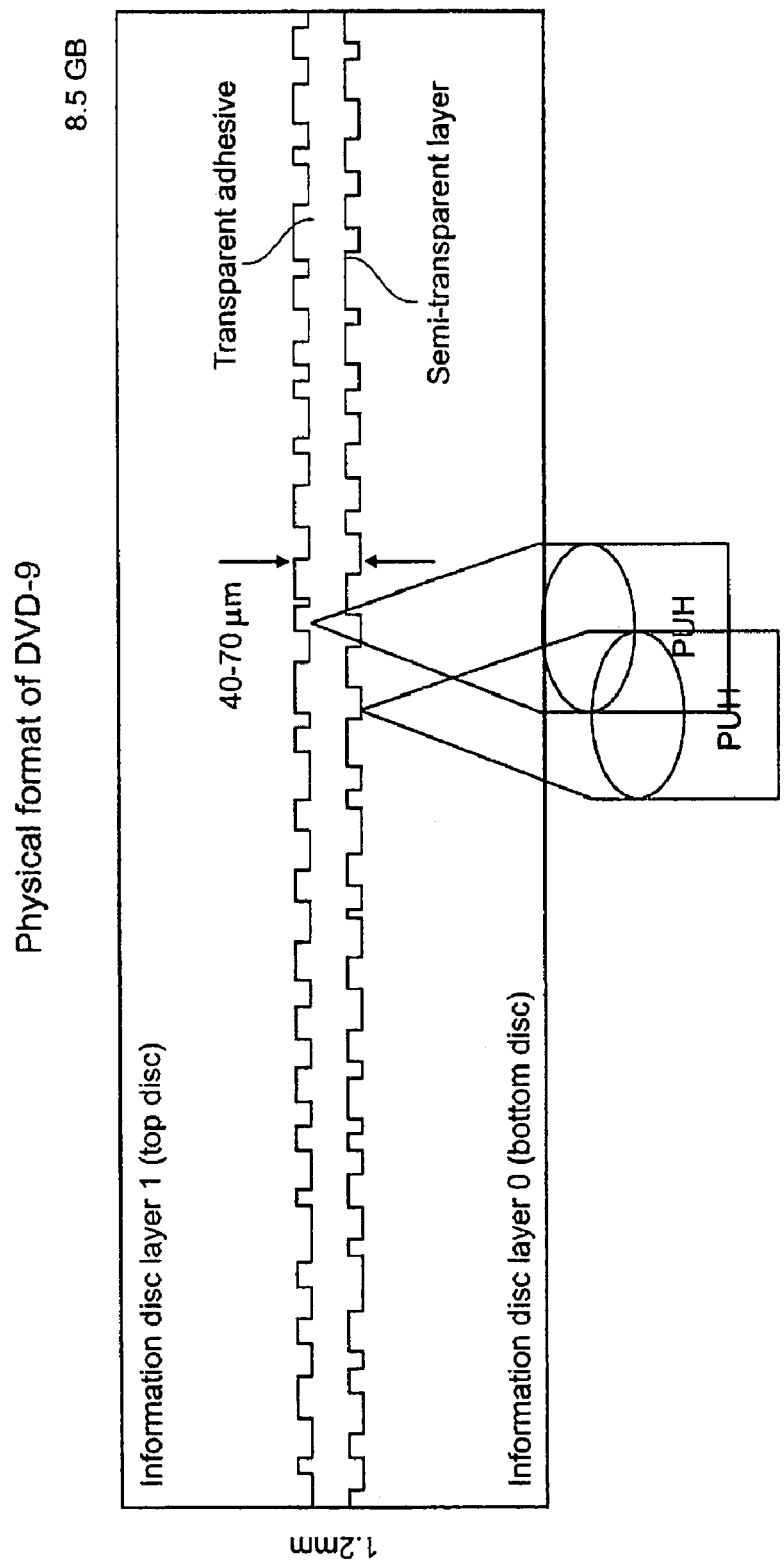
FIG. 2 shows a partial cross-sectional view of a known DVD-9.
Figure 9:
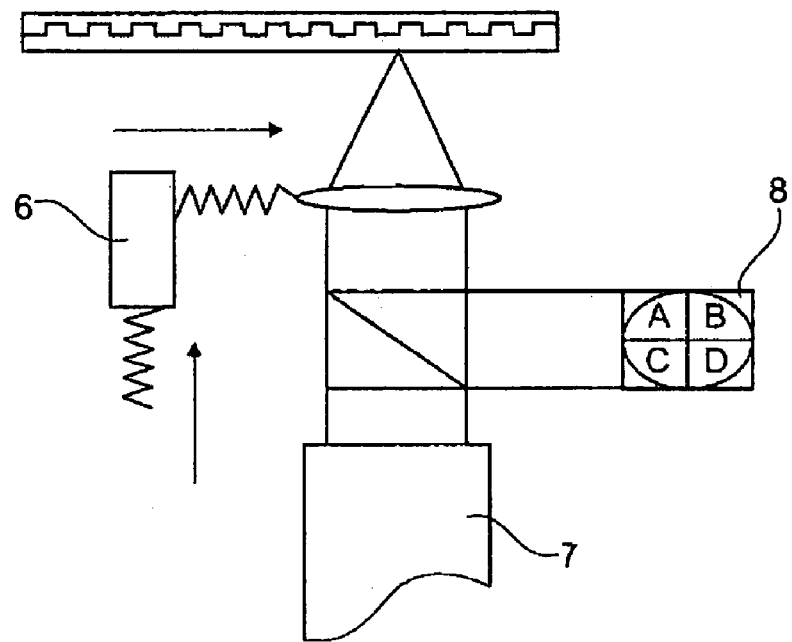
FIG. 9 is a schematic drawing of a laser focusing mechanism and a photo diode for reading an optical recording medium.

FIG. 2 shows a partial cross-sectional view of a known DVD-9 having a total storage capacity of 8.5 GB and a total thickness of also 1.2 mm. A DVD-9 has two information discs 1 and 1' with two recording layers 3 and 3'. The first (lower) recording layer 3' is semi-transparent so that the laser beam can alternatively be focused on the first (lower) or the second (upper) recording layer from the bottom side. For this purpose, a transparent adhesive is used for bonding the information discs together. Further, the laser beam system or the convection lens system of the laser is adjustable so that the focus of the laser beam is located on the desired recording layer. A schematic drawing of such a focusing mechanism 6 for a laser 7 is shown in FIG. 9. The laser beam is reflected by the recording layer and is then directed by a semi-permeable mirror to a photo diode 8.

Figure 3:
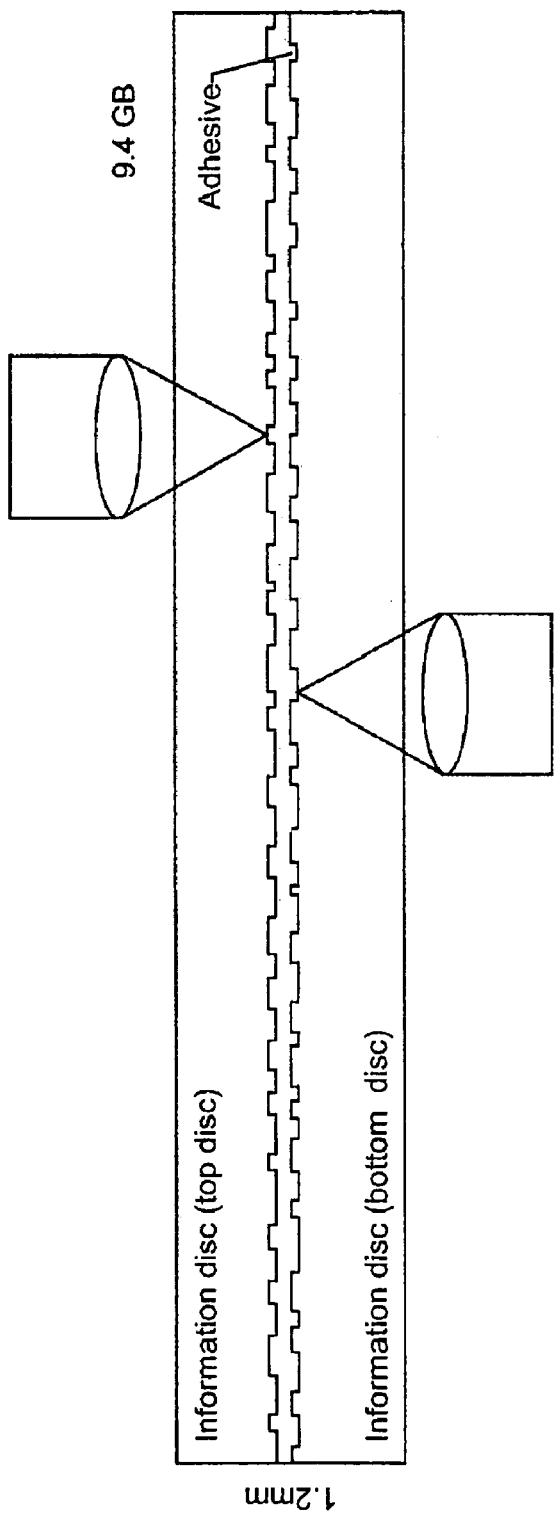
FIG. 3 shows a partial cross-sectional view of a known DVD-10.

FIG. 3 shows a partial cross-sectional view of a known DVD-10 having a total storage capacity of 9.4 GB and a total thickness of also 1.2 mm. The physical format is similar to a DVD-9. However, the (second) upper recording layer 3' is read by a second laser beam 5' which is arranged on the side of the second (upper) information disc (opposed to the first laser beam 5).

Figure 4:
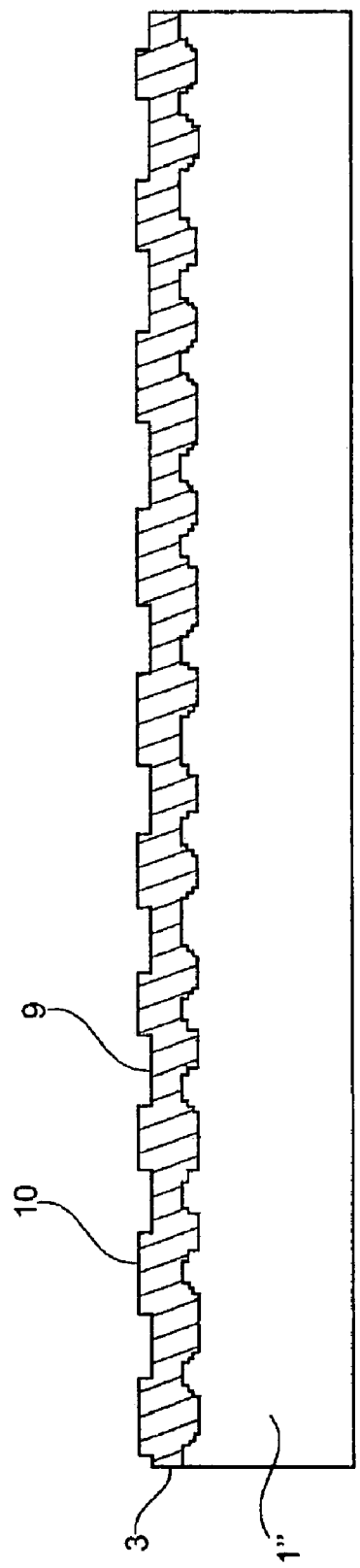
FIG. 4 shows a partial cross-sectional view of a known CD.

Finally, FIG. 4 shows a partial cross-sectional view of a known CD which only comprises one disc 1" made of polycarbonate. The recording layer 3 is only covered by a protective lacquer 9 which usually carries a printed layer 10. The total thickness of a CD is again about 1.2 mm. However, the recording layer is not positioned in the center of the recording medium (between two discs), but at the top the recording medium. Therefore, the distance from the lower surface of the disc 1" to the recording layer 3 is about 1.0 mm to about 1.15 mm. Since the CD is identically positioned within the drive like a DVD (in case of a combinational drive which is suitable for DVDs and CDs), the focusing mechanism 6 must be suitable to focus the laser beam to the height of the recording layer of the CD which is higher than the recording layer(s) of a DVD.

Figure 6:
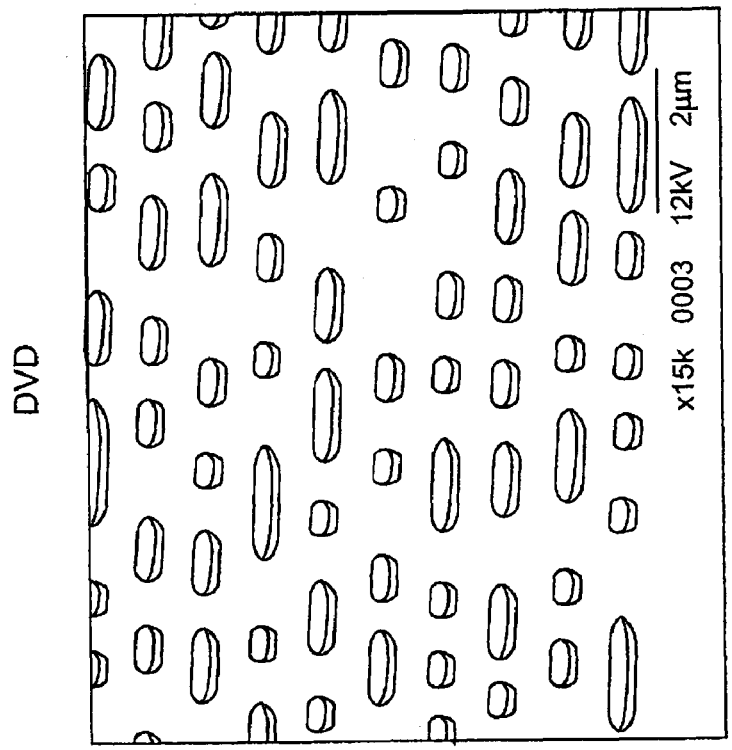
FIGS. 5 and 6 show microscope pictures of a recording layer of a CD and of a DVD, respectively.
Figure 5:
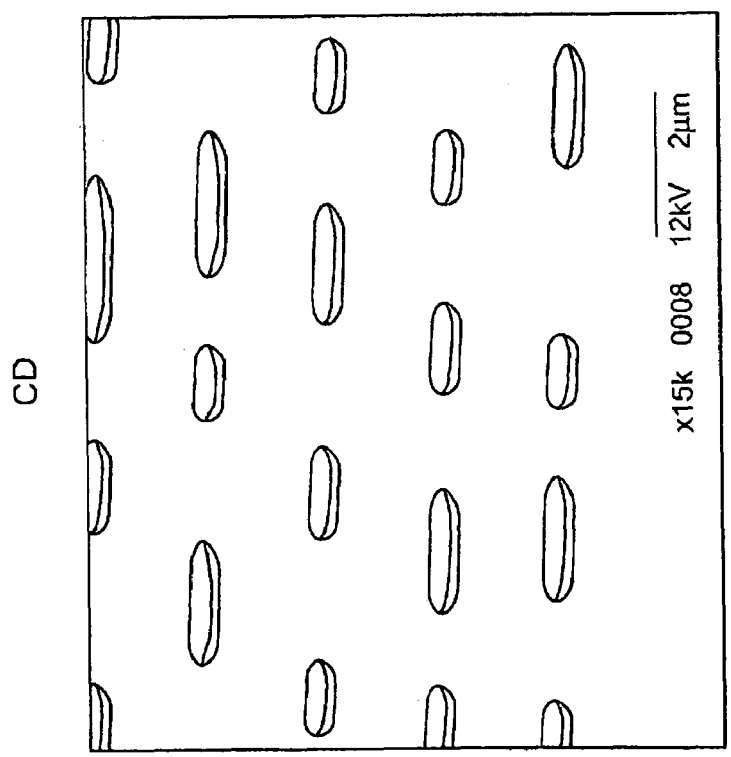

In this context, it has to be noted that a laser for reading a DVD has a wavelength of about 650 nm, and a laser for reading a CD has a wavelength of about 780 nm. Therefore, a combinational drive which is suitable for DVDs and CDs needs to have two lasers for providing these two wavelengths. The reason why different wavelengths are necessary is that the height difference between pits and lands of the recording layer are different for DVDs and for CDs. This height difference must be about $\lambda/4$, i.e. 650 nm/4 (+/−4%) for a DVD, and 780 nm/4 (+/−4%) for a CD. In addition, the pit and land structure of a DVD is significantly smaller compared to a CD, as can be seen in FIGS. 5 and 6 which show microscope pictures of a recording layer of a CD and of a DVD, respectively.

Figure 7:
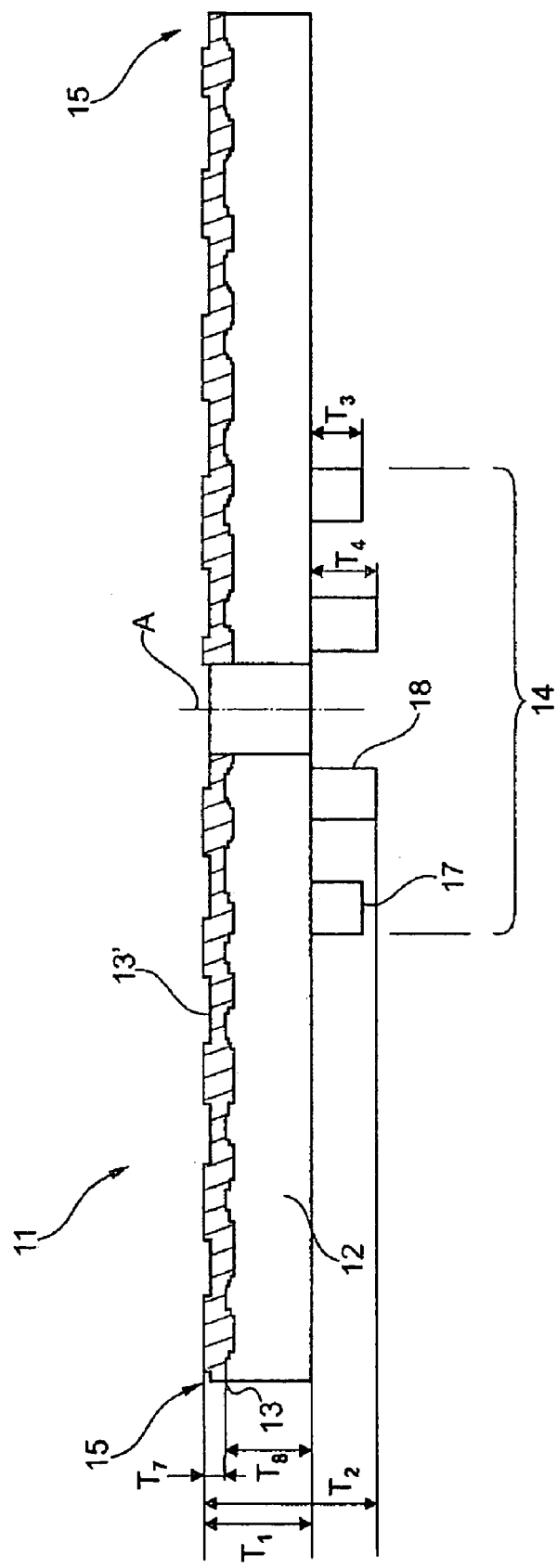
FIG. 7 shows a cross-sectional view of an optical recording medium according to a first embodiment of the present invention.

FIG. 7 shows a (schematic) cross-sectional view of an optical recording medium according to a first embodiment of the present invention. The optical recording medium comprises an information disc or a substrate 12 and a recording layer 13 arranged on one side of the substrate 12, wherein the optical recording medium has a predetermined clamping area 14. The recording layer 13 is covered by a lacquer layer 13'. The optical recording medium may have a thinner thickness in the area of the recording layer (outside of the clamping area) of—for example—only about 0.6 mm or even less. In particular, the thickness $T_1$ of the optical recording medium in an area outside of the clamping area is in the range between 0.4 to 0.7 mm. However, it is to be understood that the invention is not limited to a specific thickness of the optical recording medium. Also a total thickness $T_2$ of the optical recording medium in the outer section of the clamping area 14 of about 1.2 mm is possible.

Figure 8A:
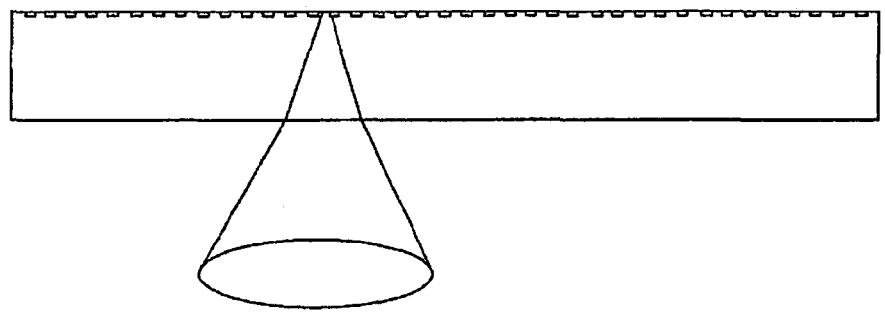
FIG. 8a shows a partial cross-sectional view of a known CD with a laser beam focused on the recording layer.
Figure 8B:
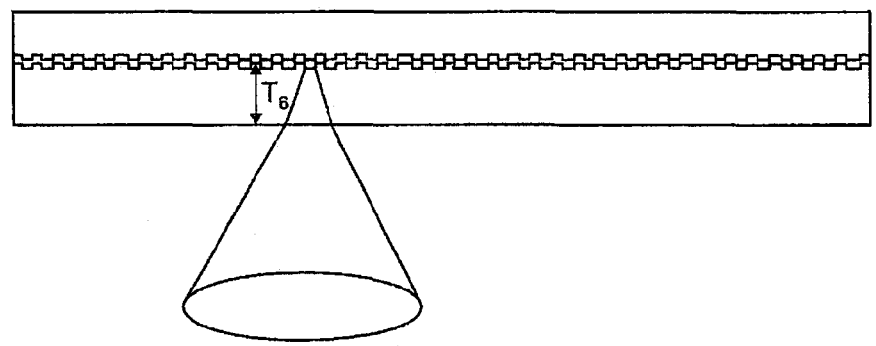
FIG. 8b shows a partial cross-sectional view of a known DVD with a laser beam focused on the recording layer.
Figure 8C:
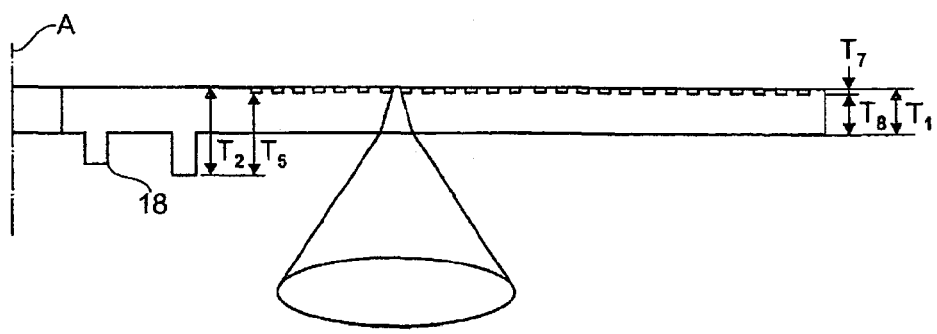
FIG. 8c shows a partial cross-sectional view of an optical recording medium according to the first embodiment of the present invention with a laser beam focused on the recording layer.

When the inventive optical recording is clamped in a drive, the recording layer has a different height compared to recording layers of known DVDs. As stated before, the recording layer(s) of a DVD according to the state of the art is/are arranged in its center (see also FIG. 8b showing a partial cross-sectional view of a known DVD with a laser beam focused on the recording layer). Contrary to that, the recording layer of a CD according to the state of the art is arranged at the top (see also FIG. 8a showing a partial cross-sectional view of a known CD with a laser beam focused on the recording layer). According to the present invention, the optical recording medium has a layer structure which is positioned at a height comparable to a CD, i.e. the recording layer is arranged at the top of an optical recording medium according to the present invention as shown in FIG. 8c. Such a layer arrangement is not known in the prior art, because a laser beam of DVD drives is focused to a distance of $T_6$ (of about 0.6 mm) with respect to the lower surface of the disc, wherein the position of this lower surface is defined by the clamping mechanism. However, in case of the situation as shown in FIG. 8c, the distance $T_5$ of the lowest part of the disc to the recording layer is significantly greater than $T_6$, namely between 1.0 mm and 1.2 mm, in particular about 1.1 mm. Some commercially available drives which are only suitable for reading DVDs have no height adjustment mechanism as shown in FIG. 9. Therefore, an inventive optical recording medium shown in FIG. 8c can not be read with such DVD drives, because the recording layer is at a height of about 1.1 mm (and not 0.6 mm).

Nevertheless, the inventive optical recording medium shown in FIG. 8c can be read with a drive which is suitable for reading DVDs and CDs, because such drives have a height adjustment mechanism as shown in FIG. 9. As a result, the inventive optical recording medium of FIG. 8c has a recording layer positioned at a height as the recording layer of a CD, and can be read in a drive by—for example—a 650 nm laser which is or can be focused on this recording layer.

Trials in the prior art with optical recording discs having a reduced thickness in the area of the recording layer compared to common DVDs or CDs (having a thickness of about 1.2 mm) were not successful, because of the reduced stiffness and/or reduced shape stability of the discs. Therefore, the reliability of such disc was not satisfying (i.e. the discs could not be played on all types of players available on the market). However, with the optical recording medium according to the present invention, this drawback is significantly reduced or even completely avoided by means of the following aspect of the present invention.

Figure 10:
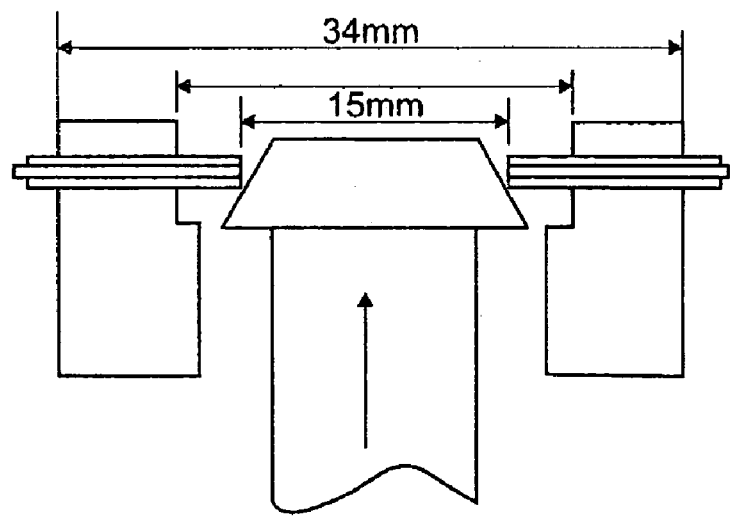
FIG. 10 shows a partial view of a clamping mechanism of a disc drive.
Figure 11:
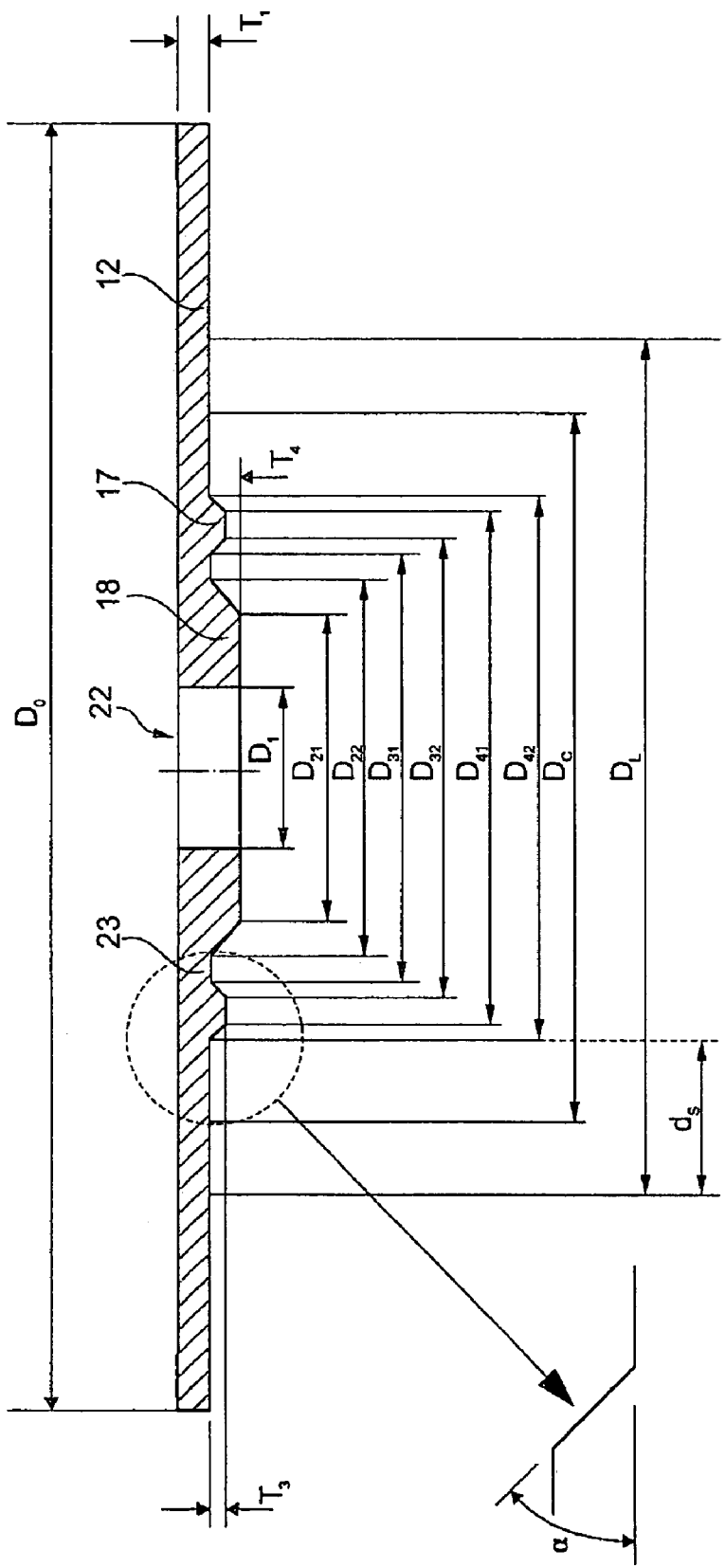
FIG. 11 shows a cross-sectional view of an optical recording medium according to a second embodiment of the present invention.

A further aspect of the present invention will be explained with reference to FIG. 11 showing a cross-sectional view of an optical recording medium according to a second embodiment of the present invention. The outer diameter $D_0$ of the optical recording medium is 120 mm in this case. In FIG. 11 the optical recording medium has a first ring 17 on the (lower) first side of the optical recording medium which extends at least in the outer section of the clamping area of the optical recording medium. According to the present DVD/CD standard, the clamping area is defined by an area located within a diameter $D_C$ of about 33 mm (or e.g. 34 mm as shown in FIG. 10). In this context outer section of the clamping area is to be understood in a broad manner. In FIG. 11 the middle of the clamping area is at a diameter of about 24 mm, wherein the first ring 17 extends in the outer section of clamping with respect to the middle of the clamping area. Further, it is preferred to provide a second ring 18 on the first side of the optical recording medium which extends at least in the inner section of the clamping area of the optical recording medium.

The first ring 17 has a thickness $T_3$ which is slightly smaller than the thickness $T_4$ of the second ring 18 (as also shown in FIG. 7). As an example, the following thicknesses of $T_3=0.3$ mm and $T_4=0.45$ mm may be used. This substrate thickness $T_1$ outside of the clamping area is most preferred in the range of 0.575 mm to 0.595 mm (about 0.6 mm), thereby placing the recording layer at a height of about 1.05 mm from the plane defined by the surface of the clamping area.

The second (inner) ring 18 may be distanced from the center hole (having a diameter of 15 mm, as shown in FIG. 10). However, as indicated in FIG. 11, the second ring 18 may also have an inner diameter $D_1$ defined by the center hole, wherein the second ring 18 has a relatively sharp edge (substantially parallel to an axis A of the optical recording medium). With that, the optical recording medium is centered more precisely in a drive so that the playability is improved. In addition, radial forces caused by an imbalance of the optical recording medium are better transmitted to the driving spindle. The second ring 18 has an outer diameter $D_2$ of approximately 18.5 mm. The outer edge of the second ring 18 is sloped, meaning inclined with respect to an axis A of the optical recording medium, forming an angle α of about 300. Thus, the outer diameter $D_2$ (or the outer edge) of the second ring 18 has an inner limit at a diameter $D_{21}$ of about 18 mm and an outer limit at a diameter $D_{22}$ of about 19.4 mm. A gap 23 is provided between the second (inner) ring 18 and the first (outer) ring 17, the substrate thickness at the gap 23 being essentially the same as the thickness $T_1$ of the information area. The radial width of the gap 23 is about 2 mm. From the outer sidewall of the outer ring 17, the substrate extends radially with a constant thickness $T_1$. It is to be understood that the thickness of the gap region 23 can differ depending on the demanded mechanical properties and/or the specific production process.

The first (inner) ring has an inner diameter $D_3$ of about 23.5 mm and an outer diameter $D_4$ of about 28 mm. The outer and inner edge of the first ring are sloped in the same way as the outer edge of the second ring 18 described above, thereby forming an angle α of about 30° with respect to an axis A of the optical recording medium. Therefore, the inner diameter $D_3$ (or inner edge) of the first ring 17 has an inner limit at a diameter $D_{31}$ of about 23 mm and an outer limit at a diameter $D_{32}$ of about 24 mm. Accordingly, the outer diameter $D_4$ (or outer edge) of the first ring 17 has an inner limit $D_{41}$ of about 27.4 mm and an outer limit at a diameter $D_{42}$ of about 28.4 mm.

Due to the above described structures, the cooling of the optical recording medium after casting the substrate in a molding process is rather inhomogeneous. The thicker ring portions 17, 18 tend to cool down slower than the thinner information area. This leads to a stress or inner tension of the resulting solid material. Such stress has effects on the optical properties like birefringence of the material, in particular if it is a polymer like polycarbonate (PC).

In the embodiment shown in FIG. 11, the first (outer) 17 ring is arranged towards the middle of the clamping area defined within a diameter $D_C$ of about 33 mm as described above. Thus, the first ring 17 is spaced at a sufficient distance $d_s$ from the beginning of the lead-in area of the optical recording medium which is at a diameter $D_L$ of about 45 mm. The lead-in area is the innermost part of the information area of the optical recording medium containing data stored on the recording layer. By placing the outermost ring at a sufficient distance $d_s$, the occurrence of increased birefringence values in the lead-in area of the optical recording medium can be avoided, which could otherwise result in playability problems of the optical recording medium. A distance $d_s$ of about 8 mm was found to be sufficient. Furthermore, due to cooling process after moulding of the optical recording medium, it is preferable that the first (outer) ring 17 has a smaller thickness than the second (inner) ring 18. Thereby, material stresses (and thus birefringence effects) caused by the first ring which is closer to the lead-in area may be reduced.

It is to be understood that instead of the geometric shape of "rings", the axially protruding structures on the lower side of the optical recoding medium can be of different shape in order to provide a suitable clamping area. For instance, the axial protrusions can be formed like a number of dots and/or a multitude of radially extending short lines (not displayed).

Further, it is to be understood that the axially protruding structures need not necessarily be casted together with the rest of the substrate. It would be possible to bond e.g. ring-like structures to an entirely flat substrate disc, hence reducing birefringence problems as described above.

When designing an optical recording medium attention has to be paid to the physical properties of the medium, in particular with respect to the clamping of the optical recording medium in a drive of a player. According to the "DVD Specifications" mentioned above, there are three basic types of drives and clamping mechanisms which will be explained in with reference to FIGS. 14a to 14c.

Figure 14A:
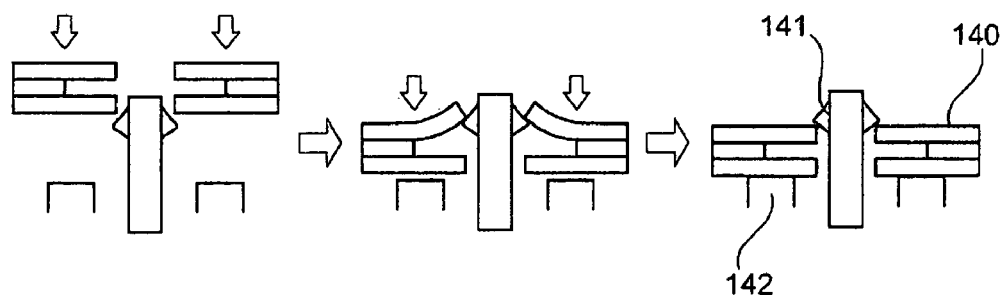
FIG. 14a shows a first type of clamping mechanism for an optical recording medium.

FIG. 14a shows a first type of clamping mechanism for an optical recording medium, the so called "note book type" mechanism. FIG. 14a shows by way of example the clamping action of a conventional DVD 140 comprising two substrates bonded together by an adhesive and having a total thickness of about 1.2 mm. The clamping is performed on the corner of the center hole by forcing the corner downwardly passed some clamping nails 141 until the DVD 140 is in a fixed state. The clamping nails 141 then contact the upper side of the DVD 140 while the lower side is placed on a tray 142.

Figure 14B:
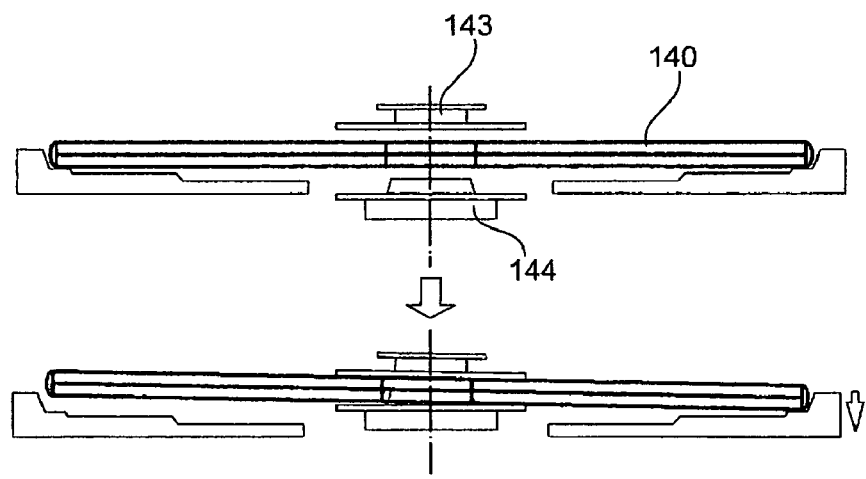
FIG. 14b shows a second type of clamping mechanism for an optical recording medium.

In FIG. 14b a second type of clamping mechanism for an optical recording medium is shown which is a "tray loader type" mechanism. The conventional DVD 140 is placed in the drive with the center hole arranged between a top clamping part 143 and a bottom clamping part 144. The bottom clamping part 143 and the bottom clamping part 144 are then moved towards each other, thereby fixing the DVD 140 in between.

Figure 14C:
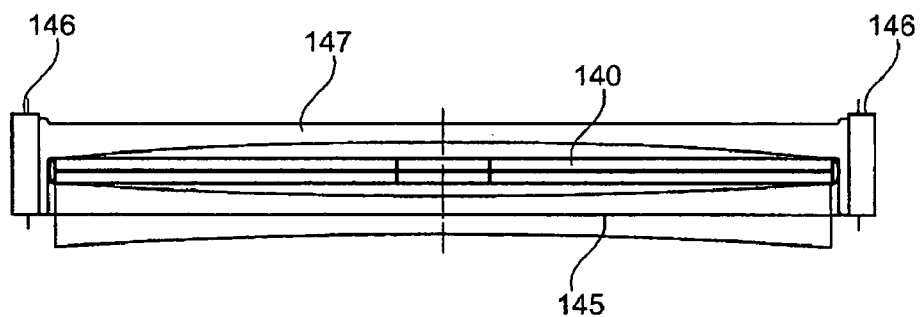
FIG. 14c shows a third type of clamping mechanism for an optical recording medium.

A third type of clamping mechanism for an optical recording medium is shown in FIG. 14c, the so called "slot-in type" mechanism. The DVD 140 is moved into the drive by means of a loading roller 145 on the bottom and two guide shafts 146 on each side of the DVD 140, while a disc guide 147 forms an upper bound for the DVD 140.

The first and/or the second ring of the inventive optical recording medium should be designed in such a way as to be suitable for clamping in all different kinds of players. It has in particular been a challenge to design an optical recording medium suitable for the so called "note book type drive". Nevertheless, it has to be noted that the optical recording medium should also be suitable for other kinds of drives.

Figure 15:
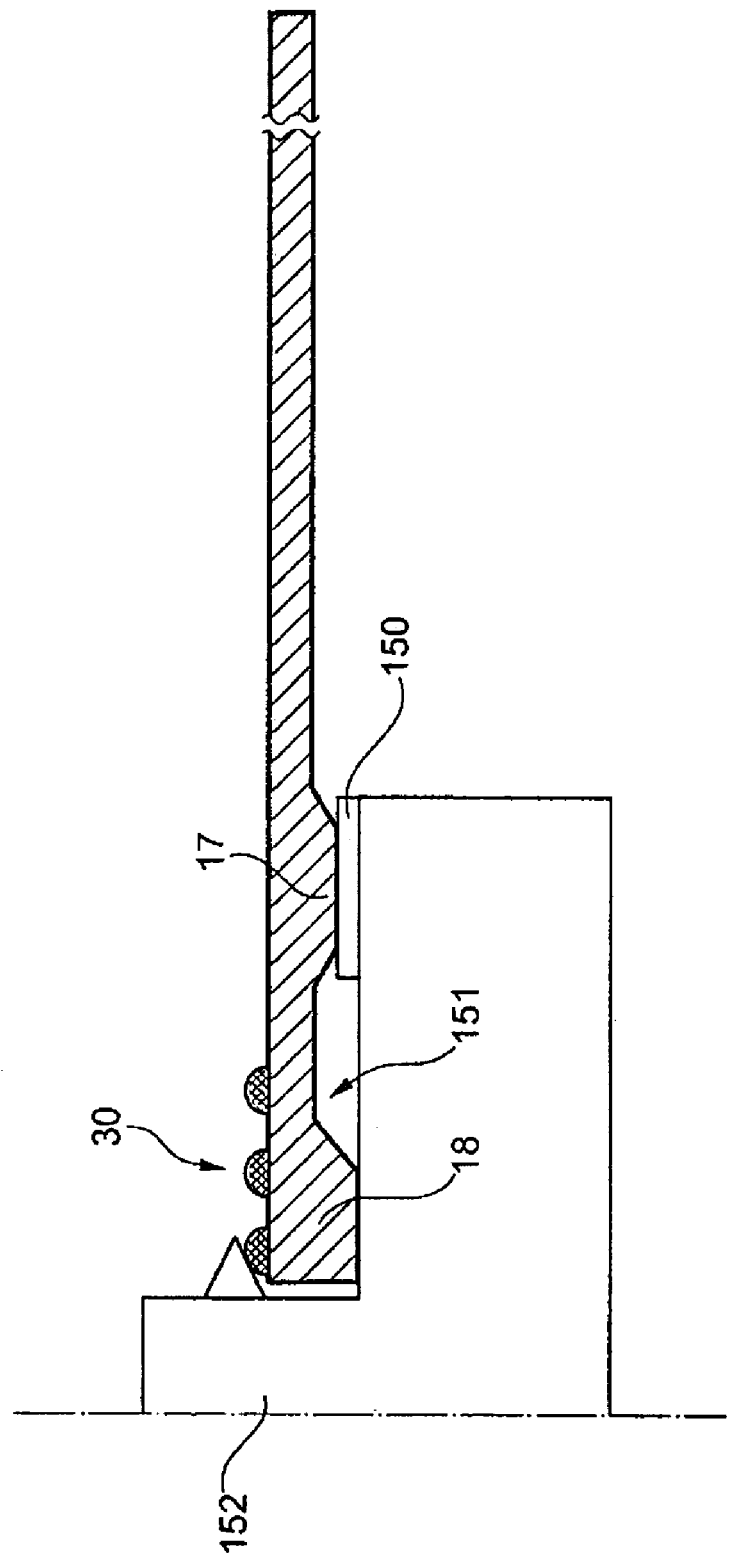

FIG. 15 shows a cross-sectional view of an optical recording medium according to the invention in its clamped state in a "note book type drive" shown in FIG. 14a. The first ring 17 is basically at the same radial position as the tray 150 of the clamping mechanism of the "note book type drive". The second ring 18 fits into the gap 151 between the tray 150 and the center hole part 152.

Since the recording layer is placed at a position of about 1.05 mm, the substrate of the optical recording medium as such does not have the conventional maximum total thickness of about 1.2 mm, as required by most conventional drives.

Therefore, as can be seen in FIG. 15, the optical recording medium comprises several protrusions 30 on the second (upper) side of the optical recording medium which extend in the inner section of the clamping area. The protrusions 30 have a thickness of about 0.15 mm. Thus, the optical recording medium has a maximum total thickness in the clamping area of about 1.2 mm. It has to be understood that instead of protrusions also other axially protruding structures can be used, like one or more rings for example, which extend at least in the clamping area of the optical recording medium, or a thick layer of material.

Conventionally the recording layer of an optical recording medium is at least covered by a thin lacquer layer 13', and most preferably also by a thin printing layer containing visible information (e.g. title of a movie stored on the medium or the like) on the side of the second surface of the optical recording medium. Therefore, the protrusions 30 may be formed by a printing layer of increased thickness on the side of the second surface of the optical recording medium. It has been found that the technique of affixing letters for blind people can also be applied to the printing on an optical recording medium. The Braille system is a method that is widely used by blind people to read and write. It uses a dot pattern, which can be sensed with fingertips as raised portions. Therefore, the protrusions may have a thickness which is sensible by the human sense of touch, like in the case of the Braille system.

Figure 12:
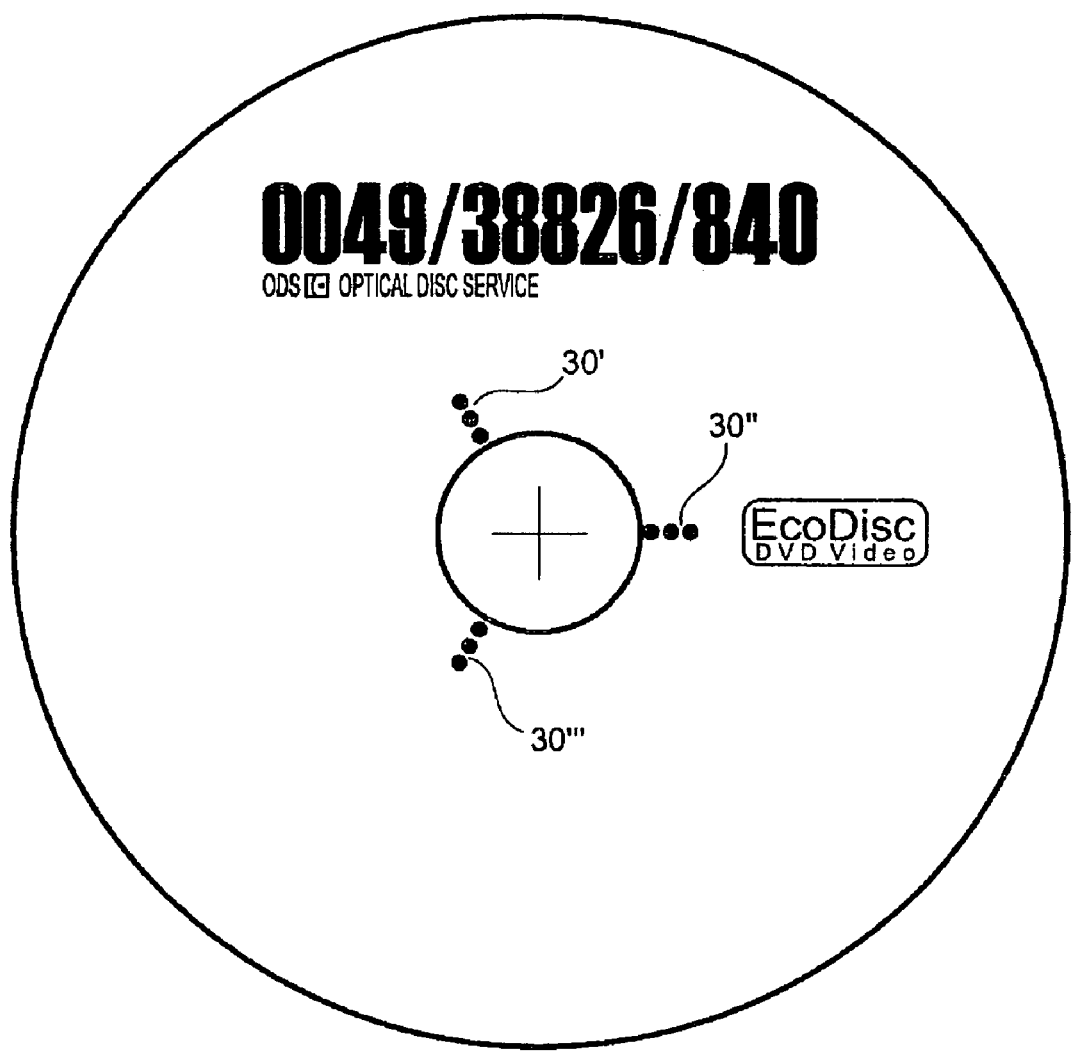
FIG. 12 shows a top view of the optical recording medium according to the invention with a first arrangement of protrusions.
Figure 13:
FIG. 13 shows a top view of the optical recording medium according to the invention with a second arrangement of protrusions.

The protrusions can be arranged in all different suitable kind of ways, for example they may form a plurality of dot patterns. FIG. 12 shows a top view of the optical recording medium according to the invention with a first arrangement of protrusions. The protrusions are in the form of three straight lines of dots, forming three separate groups or dot patterns 30', 30" and 30''', which are arranged symmetrically about the center hole of the optical recording medium, namely at angular positions of 120° degrees apart from each other. FIG. 13 shows a top view of the optical recording medium according to the invention with a second arrangement of protrusions, wherein three rhombus shaped dot patterns 30', 30" and 30''' (each made up of four dots) are arranged symmetrically about the center hole of the optical recording medium at angular positions of 120° degrees apart from each other. These rhombus shaped dot patterns are easy to produce, since the position of the dots corresponds to the position of the holes in a printing mesh. Though, it has to be understood that the protrusions or dot pattern may be of any other geometric shape.

Figure 16:
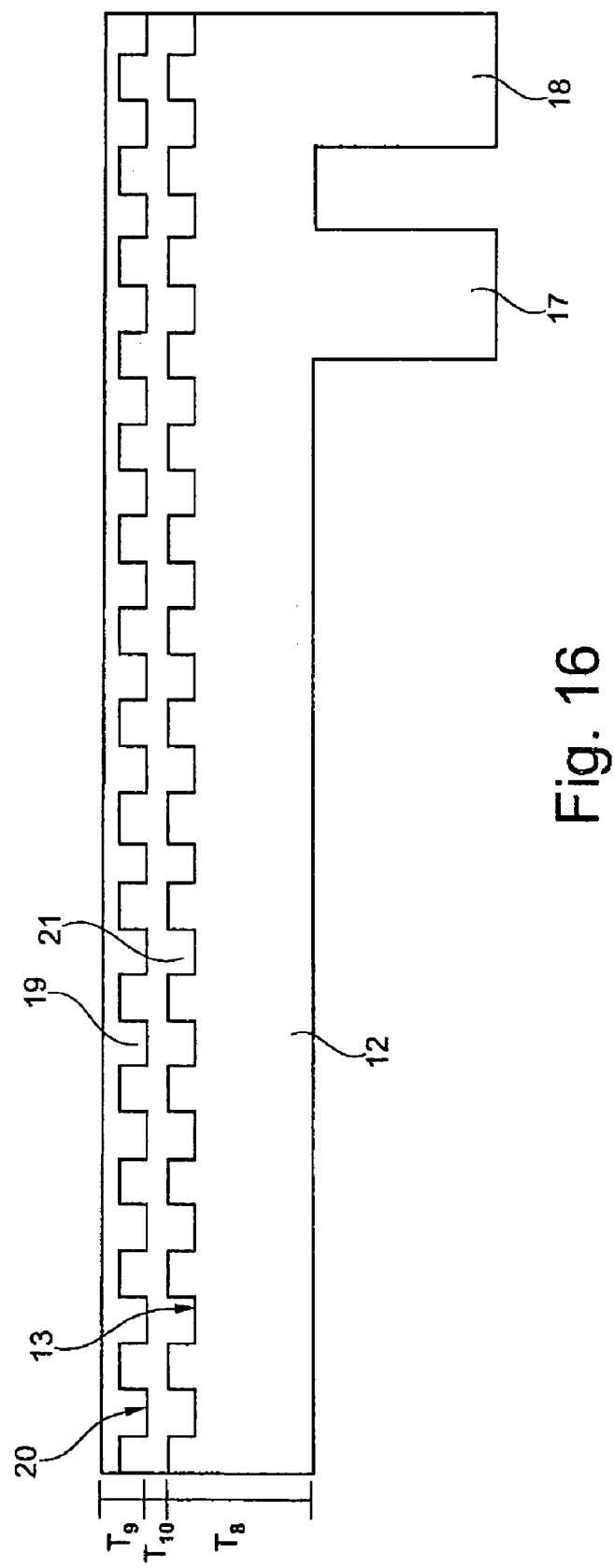
FIG. 16 shows a cross-sectional view of an optical recording medium according to another embodiment of the present invention.

FIG. 16 shows a cross-sectional view (not to scale) of an optical recording medium according to another embodiment of the present invention, which comprises all features of the first embodiment of the present invention described above. However, instead of a single substrate, the optical recording medium according to the second embodiment of the present invention comprises a second recording layer 20 carried by a second substrate 19 on the side of the second surface. The second substrate 19 may have a thickness $T_9$ of only about 0.1 mm or less, in particular 0.08 mm to 0.15 mm. With this measure, the data capacity can be doubled wherein only a minimum additional amount of polycarbonate is needed for the second substrate. The (lower) first substrate 12 and the (upper) second substrate 19 are bonded together by a thin resin layer 21, which has a thickness $T_{10}$ of about 0.02 to 0.08 mm, in particular about 0.05 mm. The (lower) first substrate 12 has a thickness $T_8$ of about 0.4 mm to 0.6 mm, in particular about 0.50 to 0.56 mm, in particular about 0.525 mm.

Figure 17:
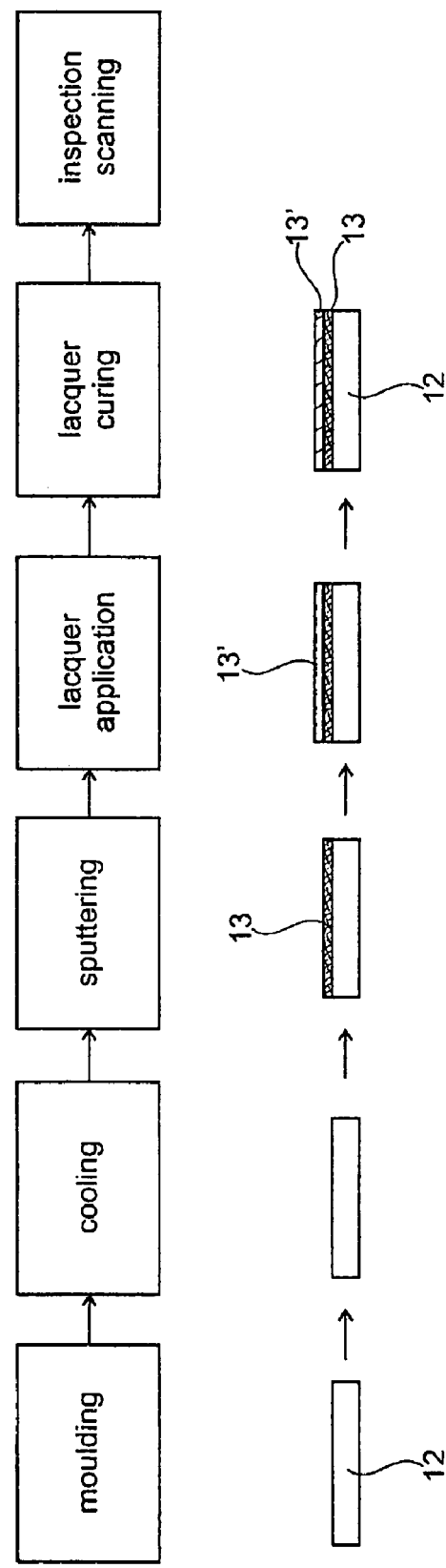
FIG. 17 shows a flow diagram of a manufacturing method of an optical recording medium.

FIG. 17 shows a flow diagram of a manufacturing method of an optical recording medium according to the present invention. When replicating such an optical recording medium, the method of manufacturing can comprise a first step of moulding of polycarbonate into a predetermined form by means of a moulding device, thereby forming a substrate 12 of the optical recording medium, e.g. by injection moulding, a second step of cooling the substrate 12 at a predetermined temperature for a predetermined time period by means of a cooling device, a third step of providing a recording layer 13 on the substrate 12, e.g. by sputtering of a metal layer by means of a sputtering device, a fourth step of providing a lacquer layer 13' on the side of the second surface of the optical recording medium by means of a lacquer application device, and a fifth step of curing the lacquer layer 13' by means of a lacquer curing device (the hatched area in FIG. 17 is to indicated the lacquer layer in its cured state). Additionally, a step of scanning the optical recording medium for quality check purposes can be provided.

After replicating the optical recording medium, the method of manufacturing can comprise a further step of providing at least one printing layer on the side of the second surface of the optical recording medium (not shown in FIG. 17). The printing layer can be provided by screen printing, though another printing technique like offset printing for example can be employed.

Figure 18:
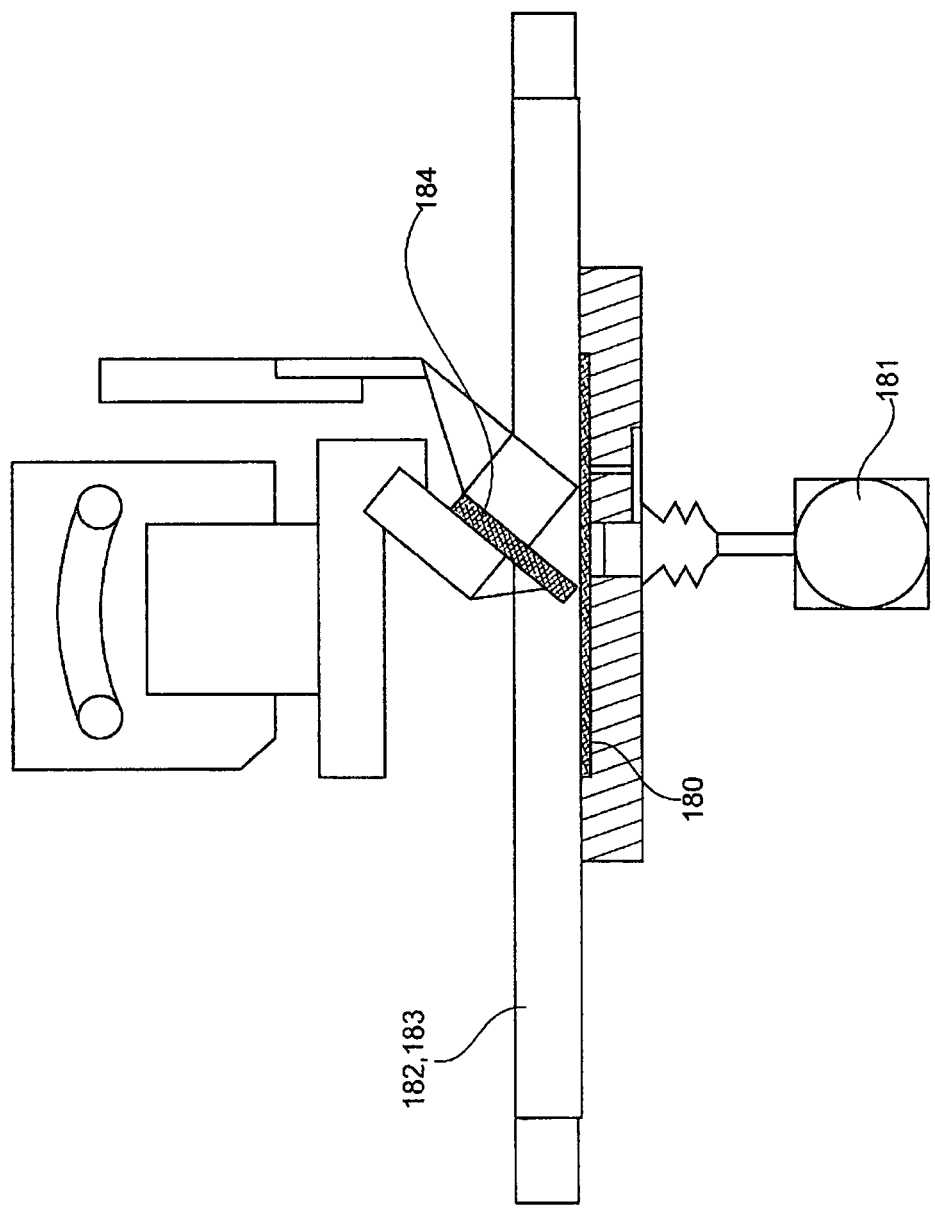
FIG. 18 shows a cross-sectional view of a printing device.

FIG. 18 shows a cross-sectional view of a printing device used for manufacturing an optical recording medium using the screen printing technique. First, the optical recording medium is placed into a cavity 180 adapted to retain it in position and is then lifted to the correct height. Additionally, vacuum is applied to the first (lower) surface by means of a vacuum pump 181. Then a predetermined quantity of ink of a specific colour is placed on top of a mesh screen 182 which is located in a mesh frame 183 above the cavity 180. A blade 184 is then pressed down and moved forward and backward across the mesh screen 182, thereby applying the ink to the second (upper) surface of the optical recording medium through the mesh screen 182. Subsequently, especially when UV activated ink is used, the optical recording medium can be placed under an UV lamp (not shown in FIG. 18) of the printing device for activating the UV activated ink to the second (upper) surface of the recording medium. This process described for applying ink can be repeated for several different colours, thereby placing several different printing layers on top of each other. The thickness of one printing layer is conventionally in the range of about 20 µm.

In the printing device of FIG. 18, at least one printing step may be adapted for forming a much thicker print, thereby creating at least one ring or one or more protrusions on the side of the second surface of the optical recording medium. This method is similar to the technique of affixing letters for blind people using a dot pattern, which can be sensed with fingertips as raised portions (Braille system). When producing these protrusions of increased thickness, a mesh with an increased size of the holes compared to a conventional CD or DVD printing technique has to be used. Additionally, the process parameters of the printing process might have to be changed. It has been shown that a thickness of up to 250 µm can be achieved. The conventional printing method for an optical recording medium does not have to be changed drastically. Therefore, this method is cheap, easy and does not require the use of any additional material.

What is claimed is:

1. An optical recording medium comprising:
    a substrate having a first side and a second side, the substrate comprising a recording area and a clamping area, the optical recoding medium being readable with a laser from the first side;
    a recording layer arranged on one side of the substrate;
    a first protruding structure formed on the first side of the substrate, the first protruding structure having a first surface extending past a plane defined by the first side of the recording area and configured to engage at least a first portion of a drive used to read or write the optical recording medium, wherein the first protruding structure is located at least partially within the clamping area and comprises a ring-shaped structure having an inner diameter within a range of 22 mm to 26 mm, inclusive;
    a second protruding structure formed on the second side of the substrate, the second protruding structure having a second surface extending past a plane defined by the second side of the recording area and configured to engage at least a second portion of the drive, wherein the second protruding structure is located at least partially within the clamping area and is formed from at least one printing layer having thickness of between 0.1 mm and 0.3 mm, inclusive; and a third protruding structure formed on the first side of the substrate, wherein the third protruding structure comprises a ring-shaped structure having an outer diameter within a range of 16 mm to 22 mm, inclusive.

2. The medium of claim 1, wherein the inner diameter of said first protruding structure is substantially 23.5 mm.

3. The medium of claim 1, wherein the said first protruding structure has an outer diameter substantially within a range between 26 mm and 35 mm, inclusive.

4. The medium of claim 3, wherein the outer diameter of said first protruding structure is substantially 28 mm.

5. The medium of claim 1, wherein the first or third protruding structure has a sharp edge that is substantially perpendicular to a surface of the clamping area.

6. The medium of claim 1, wherein one of the first and third protruding structures has a sloped edge having an incline with respect to a surface of the clamping area.

7. The medium of claim 6, wherein the sloped edge forms an angle substantially within a range between 10° and 60°, inclusive, with respect to the surface of the clamping area.

8. The medium of claim 7, wherein the angle is substantially 30°.

9. The medium of claim 1, wherein a thickness of the first protruding structure is less than or substantially equal to a thickness of the third protruding structure.

10. The medium of claim 1, wherein the third protruding structure has a thickness substantially between 0.3 and 0.6 mm, inclusive.

11. The medium of claim 10, wherein the thickness is substantially 0.45 mm.

12. The medium of claim 1, wherein a thickness between a third surface of the third protruding structure and the second surface of the second protruding structure is substantially within a range between 1.1 to 1.2 mm, inclusive.

13. The medium of claim 1, wherein the first protruding structure has a thickness substantially between 0.2 and 0.5 mm, inclusive.

14. The medium of claim 13, wherein the thickness is substantially 0.3 mm.

15. The medium of claim 1, wherein the drive used to read or write the optical recording medium comprises a note book type drive.

16. The medium of claim 1, wherein the thickness of said second protruding structure is substantially 0.15 mm.

17. The medium of claim 1, wherein the second protruding structure has a thickness which is sensible by human sense of touch.

18. The medium of claim 1, wherein the second protruding structure forms a plurality of dot patterns.

19. The medium of claim 18, wherein the second protruding structure is arranged symmetrically about an aperture located in a center of the optical recording medium.

20. The medium of claim 1, wherein a thickness of the optical recording medium in an area outside of the clamping area is substantially within a range between 0.4 to 0.7 mm, inclusive.

21. The medium of claim 1, wherein a thickness between the first surface of the first protruding structure and the recording layer is substantially 1.05 mm.

22. The medium of claim 1, wherein the optical recording medium comprises a disc having an outer diameter of substantially 120 mm.

* * * * *